J. F. GRACE.
COUNTER CURRENT CONDENSER.
APPLICATION FILED FEB. 16, 1911.

1,010,044.

Patented Nov. 28, 1911.

UNITED STATES PATENT OFFICE.

JOHN F. GRACE, OF NEW YORK, N. Y., ASSIGNOR TO HENRY R. WORTHINGTON, OF NEW YORK, N. Y., A CORPORATION OF NEW JERSEY.

COUNTER-CURRENT CONDENSER.

1,010,044.   Specification of Letters Patent.   Patented Nov. 28, 1911.

Application filed February 16, 1911. Serial No. 609,017.

*To all whom it may concern:*

Be it known that I, JOHN F. GRACE, a citizen of the United States, residing at the borough of Brooklyn, county of Kings, city and State of New York, have invented certain new and useful Improvements in Counter-Current Condensers, fully described and represented in the following specification and the accompanying drawings, forming a part of the same.

This invention relates to that class of counter current condensers in which the exhaust steam is admitted at the top and which are especially adapted for use as base condensers for turbines, the object of the invention being to secure a greater capacity and higher efficiency within small vertical dimensions than in previous condensers of this class.

In the accompanying drawings forming a part of this specification, a condenser of the preferred form embodying the invention is illustrated, and this condenser will now be described in detail and the features forming the invention then specifically pointed out in the claims.

Figure 1:
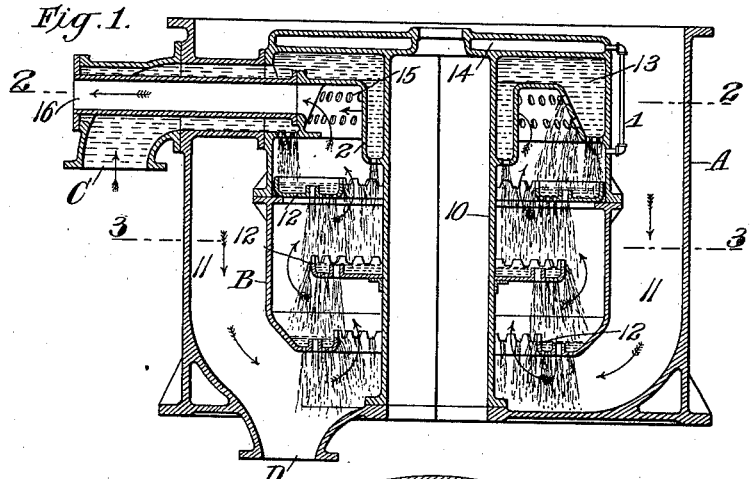
Figure 2:
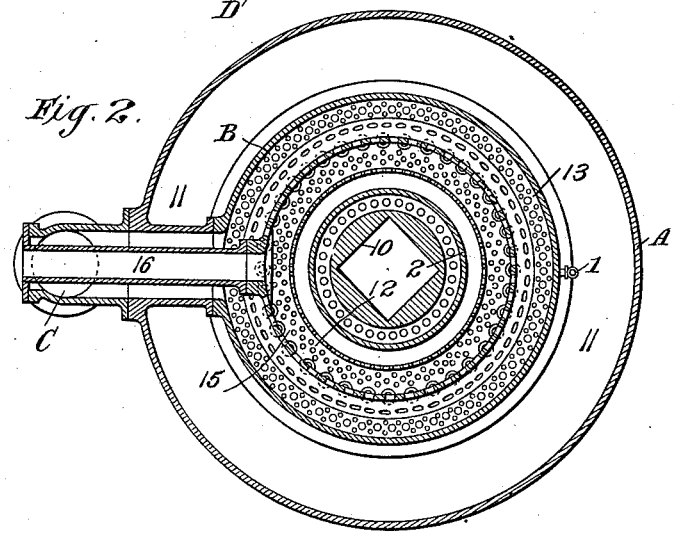
Figure 3:
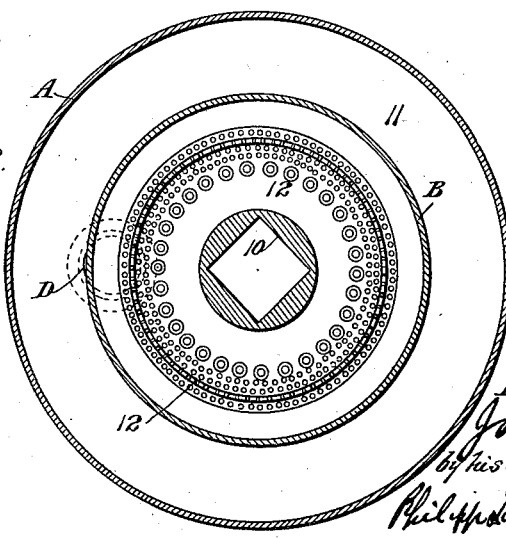

In the drawings:—Figure 1 is a vertical central section of the condenser; Figs. 2 and 3 are cross sections of the same on respectively lines 2 and 3 of Fig. 1.

Referring to the drawings, the condenser shown is of the same general type as that shown and described in United States Letters Patent to Mueller No. 952,461, the invention consisting in part of improvements in that condenser, although applicable also to other condensers of the same class.

A is the condenser shell which is shown as formed for a turbine base condenser with the central step bearing shell 10. Within the condenser shell A and separated therefrom by an annular space 11 for the exhaust steam, is an inner casing B between which and shell 10 is formed an annular condensing space, through which the steam passes upward through water jets formed by openings in the bottom and notches on the edge of a series of annular inner and outer water trays 12. This form of water tray, with both perforations and notches, is preferably used, smaller and larger flows of condensing water being thus provided for, but it will be understood that trays of any other suitable form may be used.

The injection or condensing water enters at the top of the condenser through injection pipe C and passes to water chamber 13 from which the water is sprayed downward and passes through the series of trays, the discharge water passing off at the bottom of the condenser through tail pipe D. Above the water chamber 13 is preferably formed an air chamber or space 14 to prevent the steam above the chamber from heating the incoming condensing water, this air chamber 14 preferably being connected by pipe 1 with the interior of the shell B to drain off the air chamber 14 in case of leakage, and to maintain the same vacuum in the chamber 14 as in the condensing space.

In the upper part of the condenser and inclosed by the water chamber 13, so as to be cooled by the incoming condensing water, is air chamber 15 to which the air and uncondensed vapor from the condenser pass, and this air and uncondensed vapor passes from the chamber 14 through air pipe 16 connected to the air pump, this air pipe 16 preferably passing through the injection pipe, as shown, so as to be cooled by the incoming condensing water. The water chamber 13 and shell 10 preferably have a downward extension 2, inclosing and cooling the inner side of the air chamber, this extension 2 being provided at the bottom with a series of jet openings.

The operation of the condenser will be understood from a brief description: The flow of condensing water having been established, the steam entering at the top of the condenser passes through the annular space 11 and around the bottom of inner casing B, being thus distributed through the entire circuit of the condenser. The steam then passes upward through the water jets and is thus condensed, the water of condensation and jet water falling to the bottom of the condenser and being discharged through pipe D, as in Letters Patent No. 952,461, above referred to. Any air and uncondensed vapor passes to the air chamber 15 and through pipe 16 within injection pipe C to the air chamber.

It will be seen that the invention provides a condenser of greater capacity for the same size than that of Letters Patent No. 952,461, all the space between the steam passage 11 and the step bearing shell 10 being utilized for water trays and condensation. A high efficiency is secured also, by the admission of the injection water directly to the top of the condenser, and the cooling of the air and condensation of any vapor passing from the condenser is also secured by the cooling of the air chamber 15 and the air pipe 16 by the cold incoming condensing water. The utilization of the entire space within the shell A for the steam admission passage and the trays, with the injection water entering and air leaving the top of the condenser directly, as shown, reduces largely the dimensions of the structure for equal capacity.

While the steam passage 11 has been shown as outside the trays, and this is the preferred construction, the trays may be arranged next the shell A, and the inner casing B and steam passage 11 between the trays and step bearing shell 10, within the broader features of the invention. It will be understood also that the invention is not limited to the exact form or arrangement of the parts shown, but that modifications may be made therein without departing from the invention as defined by the claims.

What I claim is:—

1. In a counter current condenser, the combination of an outer casing open at the top for the admission of exhaust steam, and an inner casing forming an annular space for the passage of the steam downward, water trays forming water jets between which the steam passes upward, and an injection pipe and air pipe entering the condenser above the condensing space.

2. In a counter current condenser, the combination of an outer casing open at the top for the admission of exhaust steam and an inner casing forming an annular space for the passage of the steam downward, water trays forming water jets between which the steam passes upward, a water chamber above the trays, an air chamber adjacent to and cooled by the water chamber, and an injection pipe and air pipe entering the condenser above the condensing space, and connecting, respectively, with said water chamber and air chamber.

3. In a counter current condenser, the combination of an outer casing open at the top for the admission of exhaust steam, an inner casing separated from the outer casing to form an annular space for the passage of the steam downward, water trays within the inner casing forming water jets between which the steam passes upward, a water chamber above the trays, an air chamber within the water chamber, and an injection pipe and air pipe entering the condenser above the condensing space and connecting, respectively, with said water chamber and air chamber.

4. In a counter current condenser, the combination of an outer casing open at the top for the admission of exhaust steam, an inner casing separated from the outer casing to form an annular space for the passage of the steam downward, water trays within the inner casing forming water jets between which the steam passes upward, an injection water chamber above the trays, an air space above the water chamber for preventing the heating of the water by the incoming steam, and a pipe connecting said air space with the condensing space within the inner casing.

5. The combination with the outer casing A, of the inner casing B separated from the casing A to form steam space 11, step bearing shell 10 within casing B, jet trays between casing B and shell 10, water chamber 13 above the top tray, air chamber 15 cooled by the water from chamber 13, and an injection pipe and air pipe connecting with the water chamber and air chamber.

6. The combination with the outer casing A, of the inner casing B separated from the casing A to form steam space 11, step bearing shell 10 within the casing B, jet trays between casing B and shell 10, water chamber 13 above the top tray, air chamber 15 cooled by the water from chamber 13, said water chamber 13 having a downward extension 2 between the step bearing shell and inner side of the air chamber, and an injection pipe and air pipe connecting with the water chamber and air chamber.

In testimony whereof, I have hereunto set my hand, in the presence of two subscribing witnesses.

JOHN F. GRACE.

Witnesses:
  A. WHITE,
  W. H. KENNEDY.

---

Copies of this patent may be obtained for five cents each, by addressing the "Commissioner of Patents, Washington, D. C."